United States Patent
Shoemaker

[11] 3,982,821
[45] Sept. 28, 1976

[54] MICROSCOPE OBJECTIVES

[75] Inventor: Arthur H. Shoemaker, East Aurora, N.Y.

[73] Assignee: American Optical Corporation, Southbridge, Mass.

[22] Filed: Apr. 26, 1974

[21] Appl. No.: 464,385

[52] U.S. Cl. ................... 350/175 ML; 350/220; 350/224; 350/229
[51] Int. Cl.² .................. G02B 9/34; G02B 21/02
[58] Field of Search ........... 350/175 ML, 229, 220, 350/224

[56] References Cited
UNITED STATES PATENTS

| | | |
|---|---|---|
| 3,380,793 | 4/1968 | Klein .......................... 350/175 ML |
| 3,476,462 | 11/1969 | Benford ...................... 350/175 ML |
| 3,711,186 | 1/1973 | O'Connor .................... 350/175 ML |

*Primary Examiner*—John K. Corbin
*Assistant Examiner*—Conrad Clark
*Attorney, Agent, or Firm*—Alan H. Spencer; William C. Nealon; Howard R. Berkenstock, Jr.

[57] ABSTRACT

Microscope objectives having a numerical aperture of substantially 0.25 and a magnification of about 10X provide a substantially flat image field of about 24mm.

12 Claims, 4 Drawing Figures

MICROSCOPE OBJECTIVES

BACKGROUND OF THE INVENTION

This invention relates to microscope objectives and more particularly to microscope objectives which have a numerical aperture of substantially 0.25, a magnification of substantially 10X and a substantially flat image field of about 24mm. The microscope objectives of this invention are well corrected for the usual chromatic image aberrations, as well as spherical aberration, coma and astigmatism. The substantially flat image field of about 24mm is provided when the objectives are used with a conventional 10X eyepiece and a microscope having a telescope objective as described in U.S. Pat. No. 3,355,234.

THE DRAWINGS

DESCRIPTION OF THE INVENTION

Figure 1:
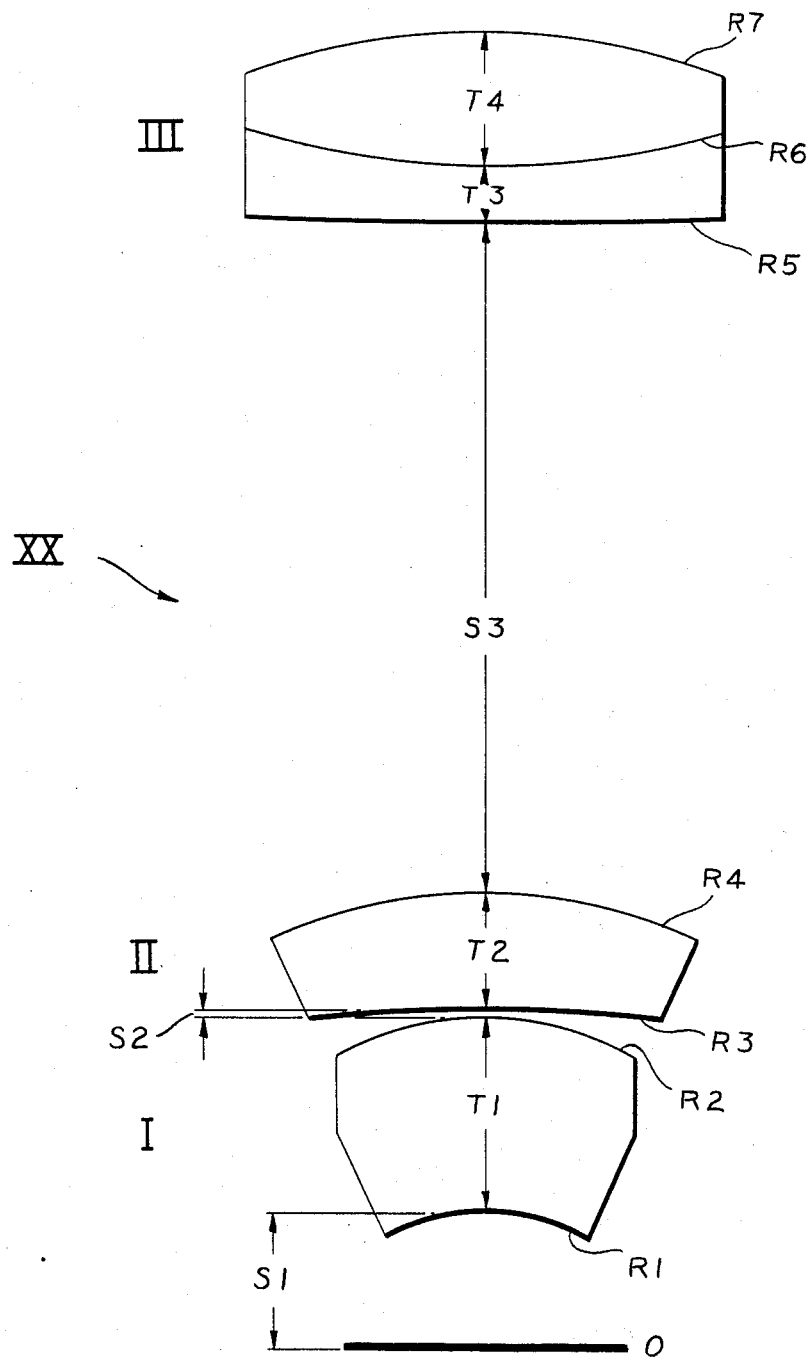
FIG. 1 is an optical diagram of one embodiment of the present invention.

Referring to FIG. 1, the objective XX is shown in a view transverse to its optical axis relative to object plane O and illustrate the lens elements aligned along the optical axis. The first element I of the objective is a concavo-convex positive singlet followed by the second lens element II, which is also a concavo-convex positive singlet. The third and final lens element III of the embodiment is a double convex positive doublet. The parameters of the objective are set forth in Table I wherein the axial thicknesses of successive lens elements are designated T1 to T4, and the successive axial spaces from the object plane (designated O) are S1 to S3. The successive lens radii are designated R1 to R7 wherein the minus sign (−) applies to surfaces whose center of curvature lies on the object side of their vertices. The refractive indices and Abbe numbers of the glasses in the successive lenses are absolute values designated ND(1) to ND(4), and $\nu(1)$ to $\nu(4)$ respectively.

TABLE I

| Lens | Radius | Thickness | Space | Refractive Index | Abbe Number |
|---|---|---|---|---|---|
| I | $R_1 = -0.297233F$ | | $S_1 = 0.201360F$ | | |
| | | $T_1 = 0.273567F$ | | $ND(1) = 1.78816$ | $\nu(1) = 47.37$ |
| | $R_2 = -0.449693F$ | | | | |
| | | | $S_2 = 0.005471F$ | | |
| II | $R_3 = -2.09030F$ | | | | |
| | | $T_2 = 0.164140F$ | | $ND(2) = 1.78816$ | $\nu(2) = 47.37$ |
| | $R_4 = -0.0780545F$ | | | | |
| | | | $S_3 = 0.961457F$ | | |
| | $R_5 = 113.3618F$ | | | | |
| III | $R_6 = 1.19907F$ | $T_3 = 0.082070F$ | | $ND(3) = 1.80491$ | $\nu(3) = 25.42$ |
| | | $T_4 = 0.191497F$ | | $ND(4) = 1.58304$ | $\nu(4) = 59.43$ |
| | $R_7 = -1.01792F$ | | | | |

In the foregoing, as well as succeeding tables, F is the focal length of the objective in millimeters and all values are to be considered variable within normal manufacturing tolerances.

The optical values for a specific objective of this embodiment having a focal length of 18.277mm are:

TABLE II

| Lens | Radius | Thickness | Space |
|---|---|---|---|
| I | $R_1 = -5.4325$ | | $S_1 = 3.680$ |
| | | $T_1 = 5.000$ | |
| | $R_2 = -8.2190$ | | |
| | | | $S_2 = 0.100$ |
| II | $R_3 = -38.204$ | | |
| | | $T_2 = 3.000$ | |
| | $R_4 = -14.266$ | | |
| | | | $S_3 = 17.573$ |
| | $R_5 = 2071.914$ | | |
| | | $T_3 = 1.500$ | |
| III | $R_6 = 21.915$ | | |
| | | $T_4 = 3.500$ | |
| | $R_7 = -18.605$ | | |

Figure 2:
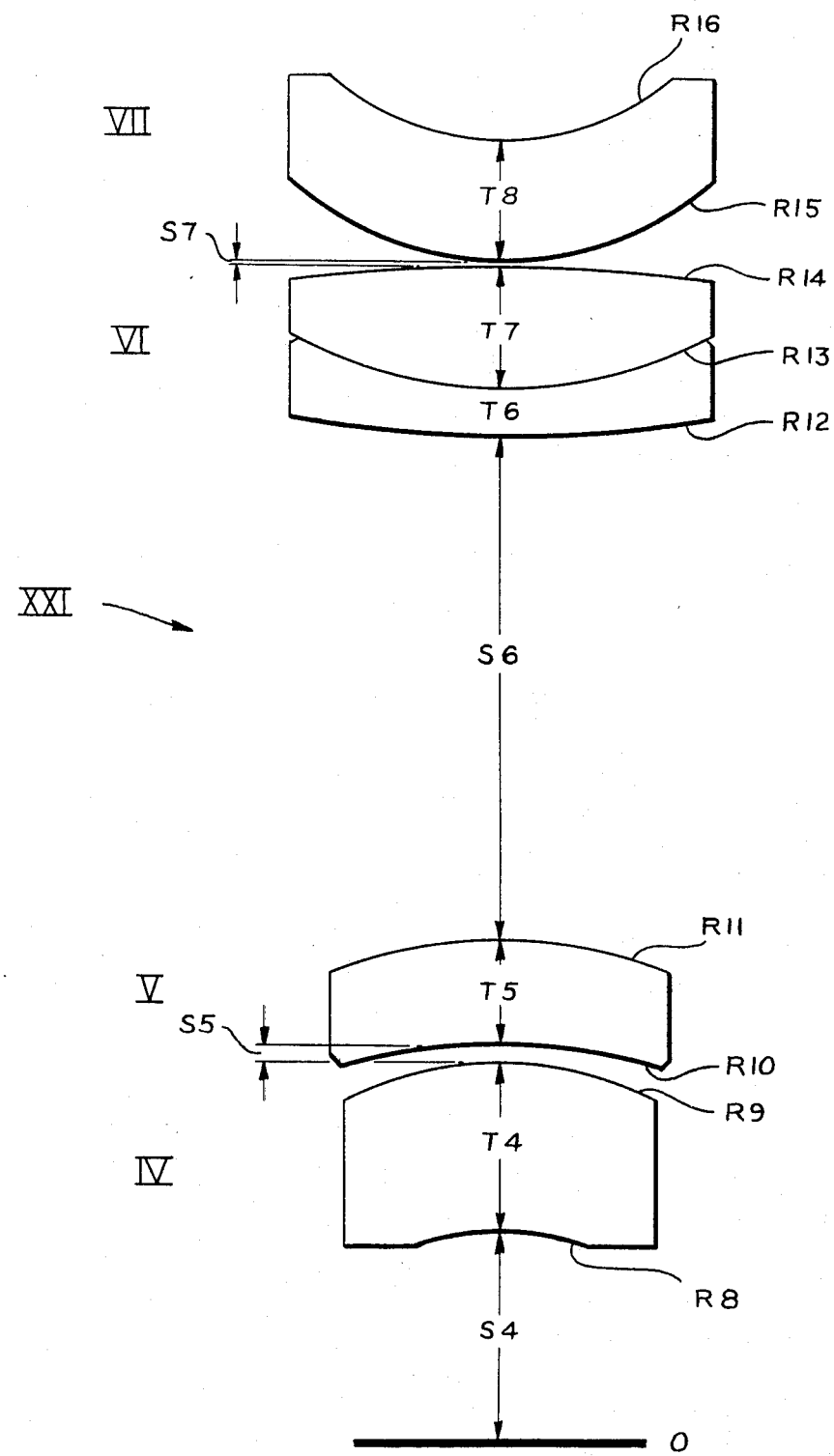
FIG. 2 is an optical diagram of another embodiment of the present invention.

Referring to FIG. 2, which is a preferred embodiment of the present invention, the first three elements, IV, V and VI of objective XXI have the same type of curvature as the three elements shown in FIG. 1 for objective XX. The fourth and final element of this embodiment is a convex-concavo negative singlet. The parameters of this objective are set forth in Table III wherein the axial thicknesses of successive lens elements are designated T5 to T9 and the successive axial spaces from the object plane (designated O) are S4 to S7. The successive lens radii are designated R8 to R16 where the minus sign (−) applies to surfaces whose center of curvature lies on the object side of their vertices. The refractive indices and Abbe numbers of the glasses in the successive lenses are absolute values designated ND(5) to ND(9), and $\nu(5)$ to $\nu(9)$ respectively.

TABLE III

| Lens | Radius | Thickness | Space | Refractive Index | Abbe Number |
|---|---|---|---|---|---|
| | | | $S_4 = 0.3382F$ | | |
| | $R_8 = -0.4274F$ | | | | |
| IV | | $T_5 = 0.2737F$ | | $ND(5) = 1.78833$ | $\nu(5) = 50.47$ |
| | $R_9 = -0.5552F$ | | | | |
| | | | $S_5 = 0.0328F$ | | |
| | $R_{10} = -0.9581F$ | | | | |
| V | | $T_6 = 0.1642F$ | | $ND(6) = 1.78833$ | $\nu(6) = 50.47$ |

TABLE III-continued

| Lens | Radius | Thickness | Space | Refractive Index | Abbe Number |
|------|--------|-----------|-------|------------------|-------------|
|      | $R_{11} = -0.7506F$ |  |  |  |  |
|      | $R_{12} = 2.2095F$ |  | $S_6 = 0.7957$ |  |  |
| VI   | $R_{13} = 0.7295F$ | $T_7 = 0.0821F$ |  | $ND(7) = 1.78446$ | $\nu(7) = 25.75$ |
|      | $R_{14} = -2.6553F$ | $T_8 = 0.1916F$ |  | $ND(8) = 1.69669$ | $\nu(8) = 56.13$ |
|      | $R_{15} = 0.5296F$ |  | $S_7 = 0.0049F$ |  |  |
| VII  | $R_{16} = 0.4342F$ | $T_9 = 0.1916F$ |  | $ND(9) = 1.69669$ | $\nu(9) = 56.13$ |

The optical values for a specific objective of this embodiment having a focal length of 18.265 are:

TABLE IV

| Lens | Radius | Thickness | Space |
|------|--------|-----------|-------|
|      |        |           | $S_4 = 6.180$ |
| IV   | $R_8 = -7.807$ | $T_5 = 5.000$ |  |
|      | $R_9 = -10.140$ |  |  |
|      |  |  | $S_5 = 0.600$ |
| V    | $R_{10} = -17.500$ | $T_6 = 3.000$ |  |
|      | $R_{11} = -13.710$ |  |  |
|      |  |  | $S_6 = 14.534$ |
|      | $R_{12} = 40.356$ | $T_7 = 1.500$ |  |
| VI   | $R_{13} = 13.325$ | $T_8 = 3.500$ |  |
|      | $R_{14} = -48.500$ |  |  |
|      |  |  | $S_7 = 0.0900$ |
|      | $R_{15} = 9.674$ | $T_9 = 3.500$ |  |
| VII  | $R_{16} = 7.934$ |  |  |

Figure 3:
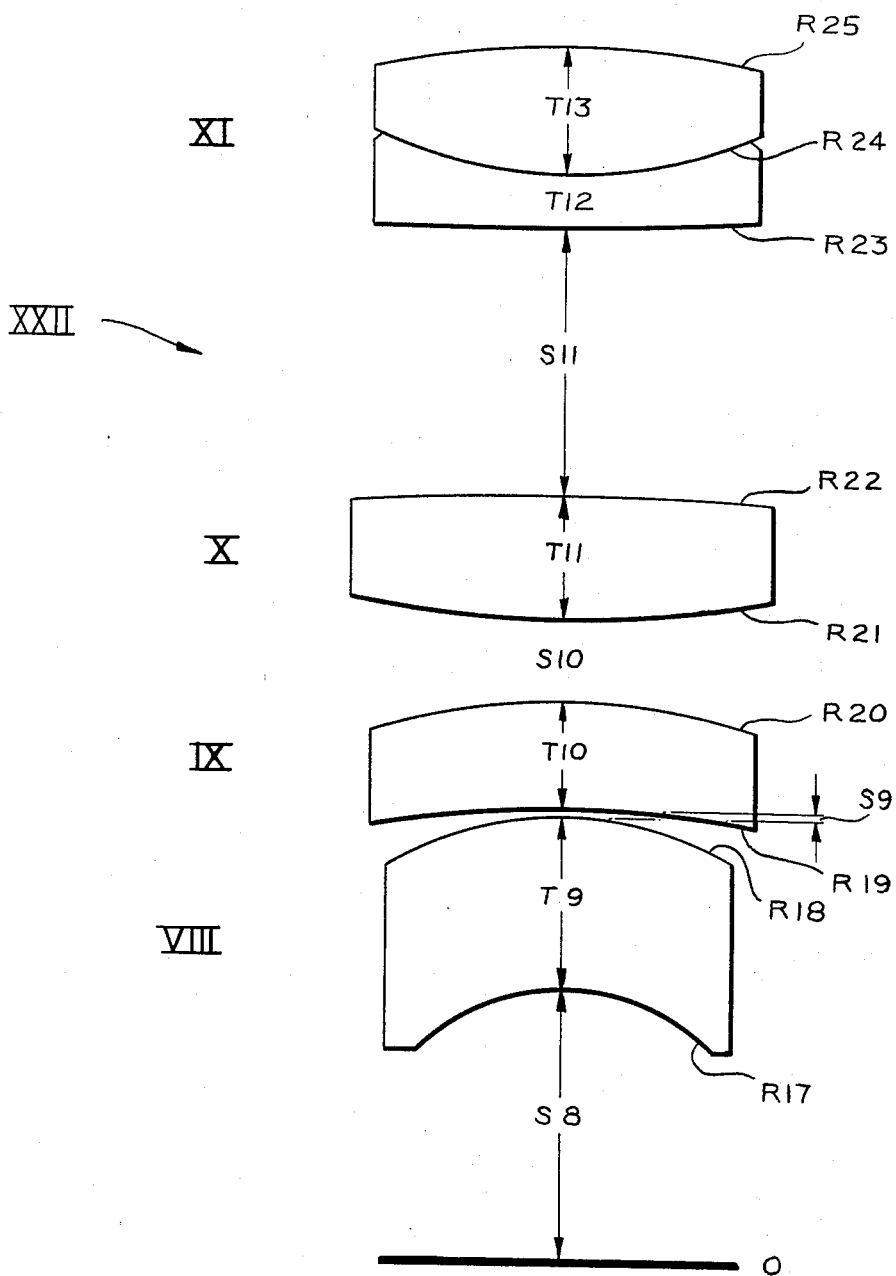
FIG. 3 is an optical diagram of a further embodiment of the present invention.

Referring to FIG. 3, an objective XXII has a first element VIII, which is a concavo-convex positive singlet, a second element IX, which is a concavo-convex positive singlet, a third element X, which is a double convex positive singlet and a fourth element XI, which is a concavo-convex positive doublet. The parameters of this objective are set forth in Table V wherein the axial thicknesses of successive lens elements are designated T9 to T13, and the successive axial spaces from the object plane (designated O) are S8 to S11. The successive lens radii are designated R17 to R25 where the minus sign (—) applies to surfaces whose center of curvature lies on the object side of their vertices. The refractive indices and Abbe numbers of the glasses in the successive lenses are absolute values designated ND(9) to ND(13), and $\nu(9)$ to $\nu(13)$ respectively.

TABLE V

| Lens | Radius | Thickness | Space | Refractive Index | Abbe Number |
|------|--------|-----------|-------|------------------|-------------|
|      |  |  | $S_8 = 0.20151F$ |  |  |
| VIII | $R_{17} = -0.27049F$ | $T_9 = 0.27378F$ |  | $ND(9) = 1.78816$ | $\nu(9) = 47.37$ |
|      | $R_{18} = -0.47856F$ |  |  |  |  |
|      |  |  | $S_9 = 0.00548F$ |  |  |
| IX   | $R_{19} = -1.71598F$ | $T_{10} = 0.16427F$ |  | $ND(10) = 1.78816$ | $\nu(10) = 47.37$ |
|      | $R_{20} = -0.89799F$ |  |  |  |  |
|      |  |  | $S_{10} = 0.25847F$ |  |  |
| X    | $R_{21} = 3.03510F$ | $T_{11} = 0.19164F$ |  | $ND(11) = 1.78816$ | $\nu(11) = 47.37$ |
|      | $R_{22} = -7.39856F$ |  |  |  |  |
|      |  |  | $S_{11} = 0.53892F$ |  |  |
|      | $R_{23} = -4.65088F$ | $T_{12} = 0.08213F$ |  | $ND(12) = 1.80491$ | $\nu(12) = 25.42$ |
| XI   | $R_{24} = 0.76274F$ | $T_{13} = 0.19164F$ |  | $ND(13) = 1.70166$ | $\nu(13) = 41.00$ |
|      | $R_{25} = -1.15457F$ |  |  |  |  |

The optical values for a specific objective of this embodiment having a focal length of 18.263 are set forth in Table VI.

TABLE VI

| Lens | Radius | Thickness | Space |
|------|--------|-----------|-------|
|      |  |  | $S_8 = 3.680$ |
| VIII | $R_{17} = -4.940$ | $T_9 = 5.000$ |  |
|      | $R_{18} = -8.740$ |  |  |
|      |  |  | $S_9 = 0.100$ |
| IX   | $R_{19} = -13.339$ | $T_{10} = 3.000$ |  |
|      | $R_{20} = -16.400$ |  |  |
|      |  |  | $S_{10} = 4.720$ |
| X    | $R_{21} = 55.430$ | $T_{11} = 3.500$ |  |
|      | $R_{22} = -135.120$ |  |  |
|      |  |  | $S_{11} = 9.842$ |
|      | $R_{23} = -84.939$ | $T_{12} = 1.500$ |  |
| XI   | $R_{24} = 13.930$ | $T_{13} = 3.500$ |  |
|      | $R_{25} = -21.086$ |  |  |

Figure 4:
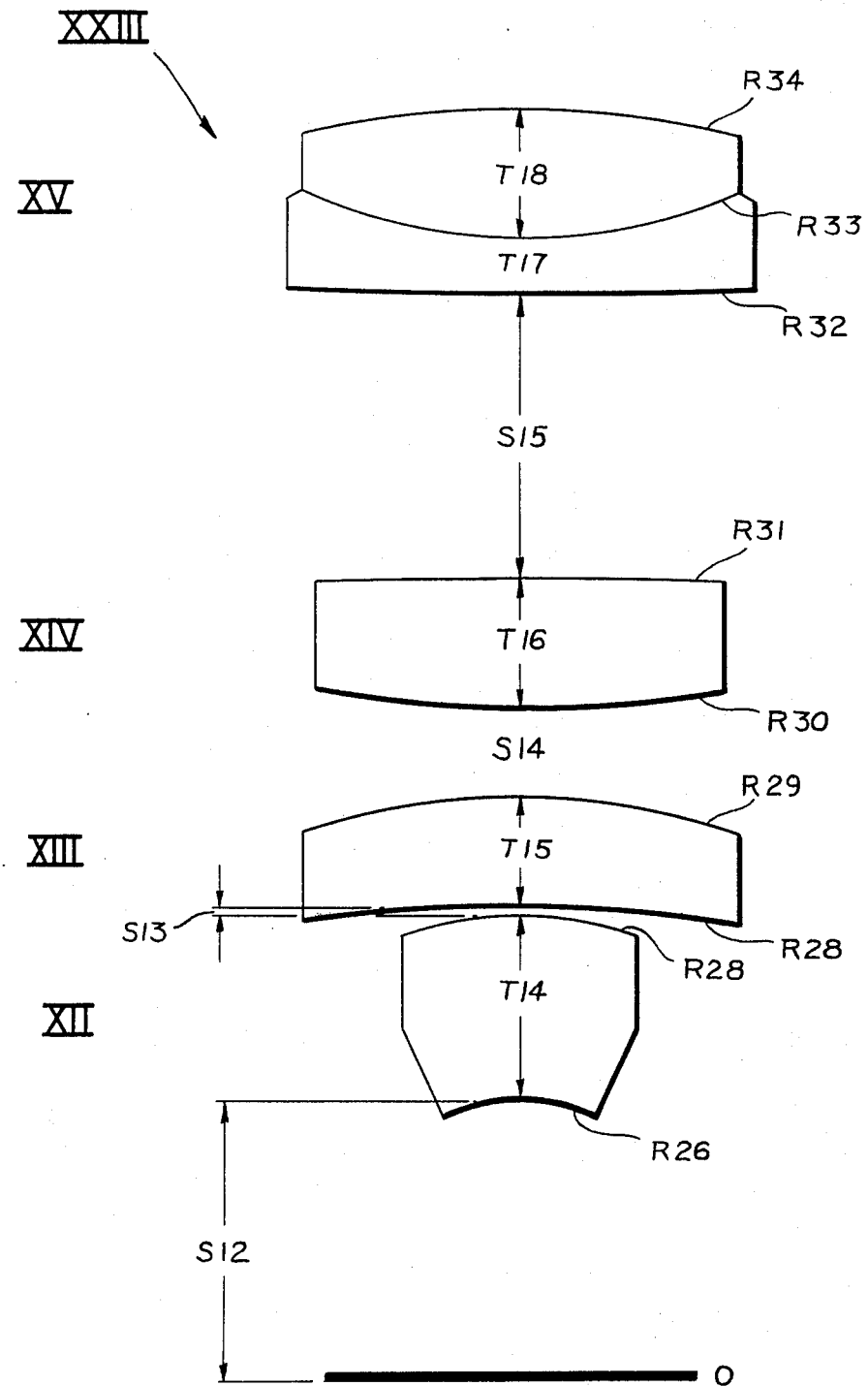
FIG. 4 is an optical diagram of a still further embodiment of the present invention.

Referring to FIG. 4, the objective XXIII has the first three elements XII, XIII and XIV with the same type of curvature as the respective elements of objective XXII in FIG. 3. The fourth and final element XV is a double convex positive doublet. The parameters of this objective are set forth in Table VII wherein the axial thicknesses of successive lens elements are designated T14 to T18, and the successive axial spaces from the object plane (designated O) are S12 to S15. The successive lens radii are designated R26 to R34 where the minus sign (—) applies to surfaces whose center of curvature lies on the object side of their vertices. The refractive indices and Abbe numbers of the glasses in the successive lenses are absolute values designated ND(14) to ND(18) and $\nu(14)$ to $\nu(18)$ respectively.

TABLE VII

| Lens | Radius | Thickness | Space | Refractive Index | Abbe Number |
|---|---|---|---|---|---|
| | | | $S_{12} = 0.40735F$ | | |
| XII | $R_{26} = -0.32605F$ | $T_{14} = 0.26827F$ | | $ND(14) = 1.78816$ | $\nu(14) = 47.37$ |
| | $R_{27} = -0.53042F$ | | | | |
| | | | $S_{13} = 0.00537F$ | | |
| XIII | $R_{28} = -2.16525F$ | $T_{15} = 0.16096F$ | | $ND(15) = 1.78816$ | $\nu(15) = 47.37$ |
| | $R_{29} = -0.99163F$ | | | | |
| | | | $S_{14} = 0.12438F$ | | |
| XIV | $R_{30} = 1.73624F$ | $T_{16} = 0.18779F$ | | $ND(16) = 1.78816$ | $\nu(16) = 47.37$ |
| | $R_{31} = -12.952F$ | | | | |
| | | | $S_{15} = 0.41384F$ | | |
| XV | $R_{32} = 12.952F$ | $T_{17} = 0.08048F$ | | $ND(17) = 1.80491$ | $\nu(17) = 25.42$ |
| | $R_{33} = 0.79515F$ | $T_{18} = 0.18779F$ | | $ND(18) = 1.52249$ | $\nu(18) = 60.13$ |
| | $R_{34} = -1.4003F$ | | | | |

The optical values for a specific objective of this embodiment having a focal length of 18.638mm are given in Table VIII.

TABLE VIII

| Lens | Radius | Thickness | Space |
|---|---|---|---|
| | | | $S_{12} = 7.592$ |
| XII | $R_{26} = -6.077$ | $T_{14} = 5.000$ | |
| | $R_{27} = -9.886$ | | |
| | | | $S_{13} = 0.100$ |
| XIII | $R_{28} = -40.356$ | $T_{15} = 3.000$ | |
| | $R_{29} = -18.482$ | | |
| | | | $S_{14} = 2.318$ |
| XIV | $R_{30} = 32.360$ | $T_{16} = 3.500$ | |
| | $R_{31} = -241.400$ | | |
| | | | $S_{15} = 7.713$ |
| XV | $R_{32} = 241.400$ | $T_{17} = 1.500$ | |
| | $R_{33} = 14.820$ | $T_{18} = 3.500$ | |
| | $R_{34} = -26.098$ | | |

The values in the foregoing tables may be adjusted to accommodate normal manufacturing tolerances.

What is claimed is:

1. A microscope objective having a numerical aperture of about 0.25 which comprises, in alignment from an object plane along an optical axis, a concavo-convex positive singlet as a first element, a concavo-convex positive singlet as a second element, and a positive doublet as another element, said positive doublet being the sole doublet of said objective and having as the second component thereof a double convex lens.

2. The microscope objective of claim 1 wherein said positive doublet is double convex and further including a convex-concave negative singlet as a fourth element aligned along the optical axis following the positive doublet.

3. The microscope objective of claim 1 wherein said positive doublet is concavo-convex and further including a double convex positive singlet as a fourth element aligned along the optical axis and being interposed between said second element and said positive doublet.

4. The microscope objective of claim 1 wherein said positive doublet is double convex and further including a double convex positive singlet as a fourth element aligned along the optical axis and being interposed between said second element and said positive doublet.

5. The microscope objective of claim 1 wherein said positive doublet is double convex and consisting of the defined lens elements having the following parameters:

| Lens | Radius | Thickness | Space | Refractive Index | Abbe Number |
|---|---|---|---|---|---|
| | | | $S_1 = 0.201360F$ | | |
| I | $R_1 = -0.297233F$ | $T_1 = 0.273567F$ | | $ND(1) = 1.78816$ | $\nu(1) = 47.37$ |
| | $R_2 = -0.449693F$ | | | | |
| | | | $S_2 = 0.005471F$ | | |
| II | $R_3 = -2.09030F$ | $T_2 = 0.164140F$ | | $ND(2) = 1.78816$ | $\nu(2) = 47.37$ |
| | $R_4 = -0.0780545F$ | | | | |
| | | | $S_3 = 0.961457F$ | | |
| III | $R_5 = 113.3618F$ | $T_3 = 0.082070F$ | | $ND(3) = 1.80491$ | $\nu(3) = 25.42$ |
| | $R_6 = 1.19907F$ | $T_4 = 0.191497F$ | | $ND(4) = 1.58304$ | $\nu(4) = 59.43$ |
| | $R_7 = -1.01792F$ | | | | | wherein axial thicknesses of successive lens elements are T1 to T4, successive axial spaces are S1 to S3, successive lens radii are R1 to R7, where the − applies to surfaces whose center or curvature lies on the object side of the vartices, refractive indices and Abbe Numbers of the successive lenses are ND(1) to ND(4), $\nu(1)$ to $\nu(4)$ respectively, and F is the focal length of the objective in millimeters.

6. The microscope objective of claim 5 wherein F is 18.277mm.

7. The microscope objective of claim 2 consisting of the defined lens elements having the following parameters:

| Lens | Radius | Thickness | Space | Refractive Index | Abbe Number |
|---|---|---|---|---|---|
|  |  |  | $S_4 = 0.3382F$ |  |  |
| IV | $R_8 = -0.4274F$ | $T_5 = 0.2737F$ |  | $ND(5) = 1.78833$ | $\nu(5) = 50.47$ |
|  | $R_9 = -0.5552F$ |  |  |  |  |
|  |  |  | $S_5 = 0.0328F$ |  |  |
| V | $R_{10} = -0.9581F$ | $T_6 = 0.1642F$ |  | $ND(6) = 1.78833$ | $\nu(6) = 50.47$ |
|  | $R_{11} = -0.7506F$ |  |  |  |  |
|  |  |  | $S_6 = 0.7957$ |  |  |
|  | $R_{12} = 2.2095F$ | $T_7 = 0.0821F$ |  | $ND(7) = 1.78446$ | $\nu(7) = 25.75$ |
| VI | $R_{13} = 0.7295F$ | $T_8 = 0.1916F$ |  | $ND(8) = 1.69669$ | $\nu(8) = 56.13$ |
|  | $R_{14} = -2.6553F$ |  |  |  |  |
|  |  |  | $S_7 = 0.0049F$ |  |  |
| VII | $R_{15} = 0.5296F$ | $T_9 = 0.1916F$ |  | $ND(9) = 1.69669$ | $\nu(9) = 56.13$ |
|  | $R_{16} = 0.4342F$ |  |  |  |  | wherein axial thicknesses of successive lens elements are T5 to T9, successive axial spaces are S4 to S7, successive lens radii are R8 to R16, where − applies to surfaces whose center of curvature lies on the object side of the vertices, refractive indices and Abbe numbers of the successive lenses are ND(5) to ND(9), $\nu(5)$ to $\nu(9)$ respectively, and F is the focal length of the objective in millimeters.

8. The microscope objective of claim 7 wherein the focal length is 18.265.

9. The microscope objective of claim 3 consisting of the defined lens elements having the following parameters:

| Lens | Radius | Thickness | Space | Refractive Index | Abbe Number |
|---|---|---|---|---|---|
|  |  |  | $S_8 = 0.20151F$ |  |  |
| VIII | $R_{17} = -0.27049F$ | $T_9 = 0.27378F$ |  | $ND(9) = 1.78816$ | $\nu(9) = 47.37$ |
|  | $R_{18} = -0.47856F$ |  |  |  |  |
|  |  |  | $S_9 = 0.00548F$ |  |  |
| IX | $R_{19} = -1.71598F$ | $T_{10} = 0.16427F$ |  | $ND(10) = 1.78816$ | $\nu(10) = 47.37$ |
|  | $R_{20} = -0.89799F$ |  |  |  |  |
|  |  |  | $S_{10} = 0.25847F$ |  |  |
| X | $R_{21} = 3.03510F$ | $T_{11} = 0.19164F$ |  | $ND(11) = 1.78816$ | $\nu(11) = 47.37$ |
|  | $R_{22} = -7.39856F$ |  |  |  |  |
|  |  |  | $S_{11} = 0.53892F$ |  |  |
|  | $R_{23} = -4.65088F$ | $T_{12} = 0.08213F$ |  | $ND(12) = 1.80491$ | $\nu(12) = 25.42$ |
| XI | $R_{24} = 0.76274F$ | $T_{13} = 0.19164F$ |  | $ND(13) = 1.70166$ | $\nu(13) = 41.00$ |
|  | $R_{25} = -1.15457F$ |  |  |  |  | wherein axial thicknesses of successive lens elements are T9 to T13, successive axial spaces are S8 to S11, successive lens radii are R17 to R25 where − applies to surfaces whose center of curvature lies on the object side of the vertices, refractive indices and Abbe numbers of the successive lenses are ND(9) to ND(13), $\nu(9)$ to $\nu(13)$ respectively, and F is the focal length of the objective in millimeters.

10. The microscope objective of claim 9 wherein F is 18.263.

11. The microscope objective of claim 4 consisting of the defined elements having the following parameters:

| Lens | Radius | Thickness | Space | Refractive Index | Abbe Number |
|---|---|---|---|---|---|
|  |  |  | $S_{12} = 0.40735F$ |  |  |
| XII | $R_{26} = -0.32605F$ | $T_{14} = 0.26827F$ |  | $ND(14) = 1.78816$ | $\nu(14) = 47.37$ |
|  | $R_{27} = -0.53042F$ |  |  |  |  |
|  |  |  | $S_{13} = 0.00537F$ |  |  |
| XIII | $R_{28} = -2.16525F$ | $T_{15} = 0.16096F$ |  | $ND(15) = 1.78816$ | $\nu(15) = 47.37$ |
|  | $R_{29} = -0.99163F$ |  |  |  |  |
|  |  |  | $S_{14} = 0.12438F$ |  |  |
| XIV | $R_{30} = 1.73624F$ | $T_{16} = 0.18779F$ |  | $ND(16) = 1.78816$ | $\nu(16) = 47.37$ |
|  | $R_{31} = 12.952F$ |  |  |  |  |
|  |  |  | $S_{15} = 0.41384F$ |  |  |

-continued

| Lens | Radius | Thickness | Space | Refractive Index | Abbe Number |
|---|---|---|---|---|---|
| XV | $R_{32} = 12.952F$ | | | | |
| | $R_{33} = 0.79515F$ | $T_{17} = 0.08048F$ | | $ND(17) = 1.80491$ | $\nu(17) = 25.42$ |
| | $R_{34} = -1.4003F$ | $T_{18} = 0.18779F$ | | $ND(18) = 1.52249$ | $\nu(18) = 60.13$ | wherein axial thicknesses of successive lens elements are T14 to T18, successive axial spaces are S12 to S15, successive lens radii are R26 to R34 where − applies to surfaces whose center of curvature lies on the object side of the vertices, refractive indices and Abbe numbers of the successive lenses are ND(14) to ND(18), $\nu(14)$ to $\nu(18)$ respectively, and F is the objective focal length in millimeters.

12. The microscope objective of claim 11 wherein F is 18.638.

* * * * *